Nov. 6, 1962   D. W. PHILLIPS   3,061,851
SHOE REPAIRING MACHINE
Filed Oct. 20, 1960   3 Sheets-Sheet 1
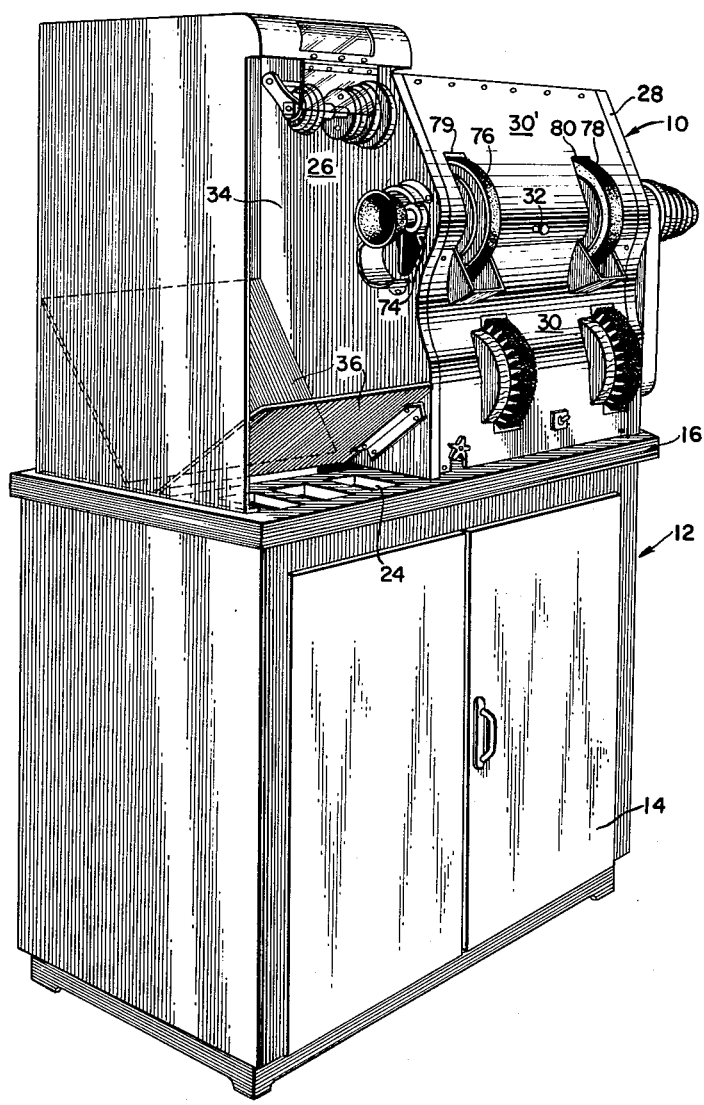
FIG.I.
INVENTOR
Donald W. Phillips
BY *Alvin Browdy*
ATTORNEY Nov. 6, 1962

D. W. PHILLIPS 3,061,851

SHOE REPAIRING MACHINE

Filed Oct. 20, 1960

3 Sheets-Sheet 2

INVENTOR
Donald W. Phillips

BY Alvin Browdy

ATTORNEY

Nov. 6, 1962  D. W. PHILLIPS  3,061,851
SHOE REPAIRING MACHINE
Filed Oct. 20, 1960  3 Sheets-Sheet 3

INVENTOR
Donald W. Phillips

BY *Alvin Browdy*

ATTORNEY 3,061,851
SHOE REPAIRING MACHINE
Donald W. Phillips, % Industrial & Merchandising Services S.A., 107 Rue de Brabant, Brussels 3, Belgium
Filed Oct. 20, 1960, Ser. No. 63,747
Claims priority, application Germany Dec. 16, 1959
8 Claims. (Cl. 12—1)

This invention relates to a shoe finishing machine for shoe repair and more particularly to a machine for trimming heels and soles to the proper contour.

Heretofore shoe repair machines have been long, horizontally extending, relatively inefficient machines which required the operator to move continually from work station to work station for each operation. These machines required a large amount of floor space and had exposed unsightly working shafts and pulleys which soon became covered with leather dust and dye. Further, the former machines had a single axle on which the tools were mounted which resulted in considerable length and also resulted in the tools all running at the same speed. Thus, a great amount of time was lost in moving from one tool to the other and the identical speeds made it impossible for the tools to operate at their optimum effectiveness.

It is an object of the present invention to provide a shoe repair machine that is very compact, occupies little floor space, is very attractive and yet permits more than one operator to work with complete tools at the same time.

Another object of the present invention is to provide a shoe repair machine that has an efficient dust collecting system.

A still further object of the present invention is to provide a shoe repair machine that encloses the shafting and is of improved appearance.

Another object of the present invention is to provide a shoe repair machine utilizing a plurality of shafts resulting in a more compact machine.

Figures 2, 3:
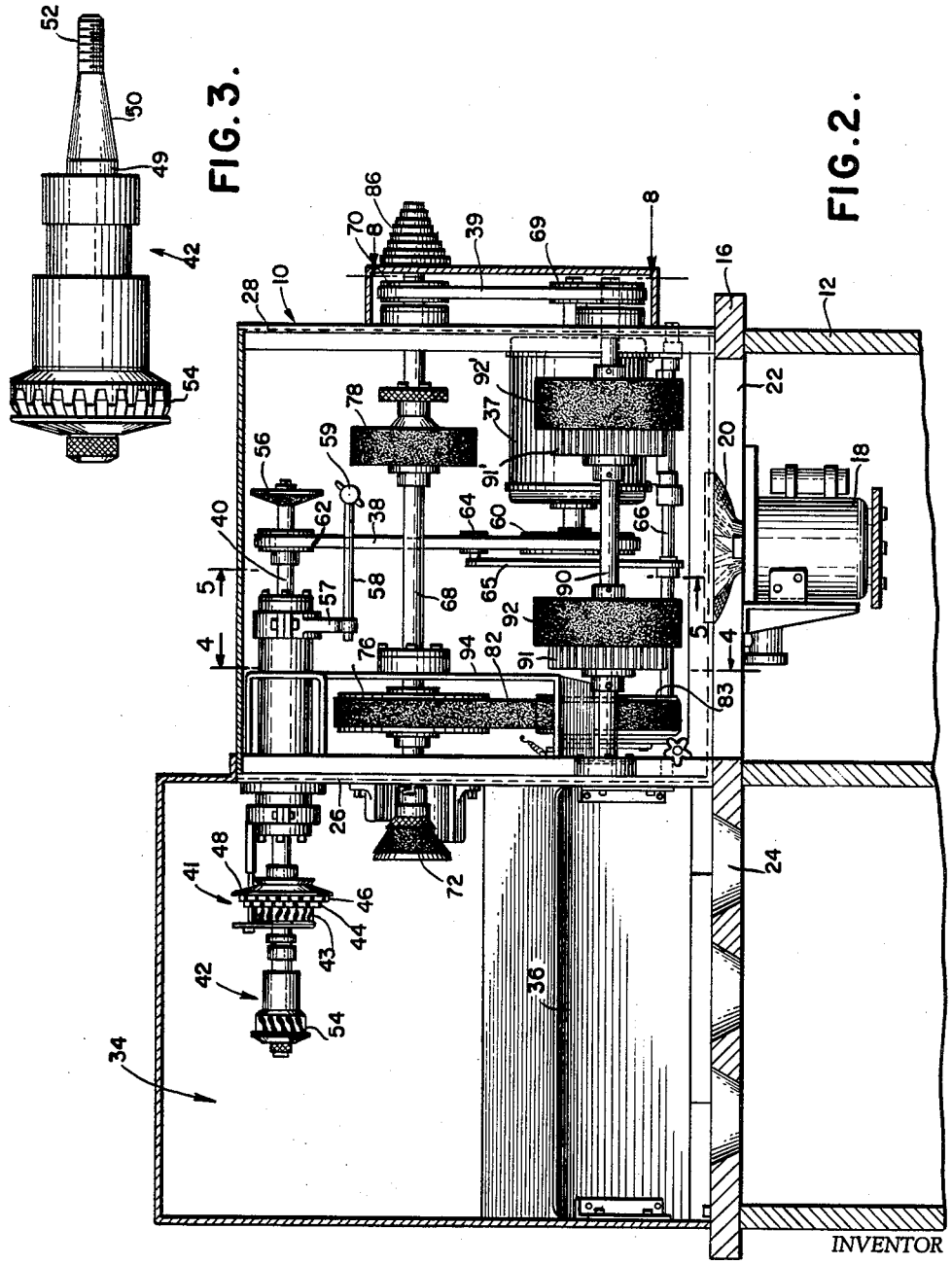
Figure 4:
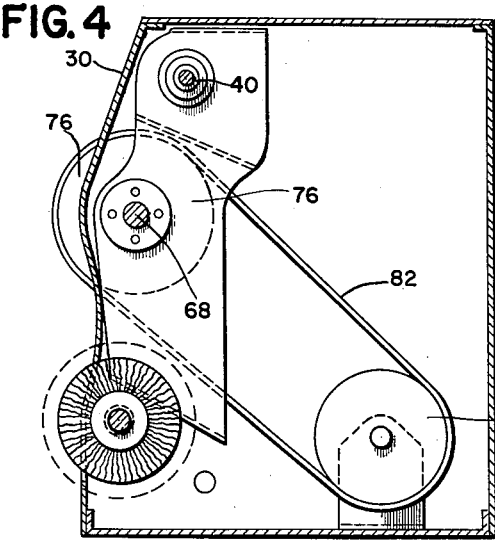
Figure 7:
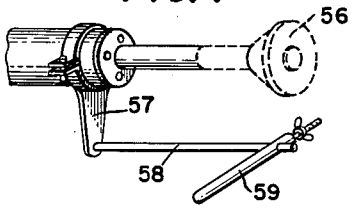
Figure 6A:
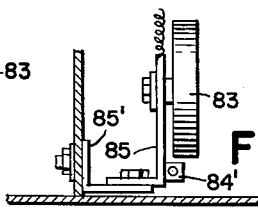
Figure 8:
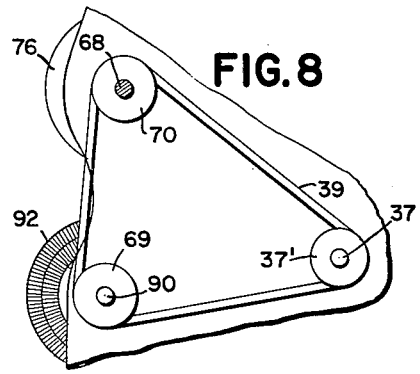
Figure 6:
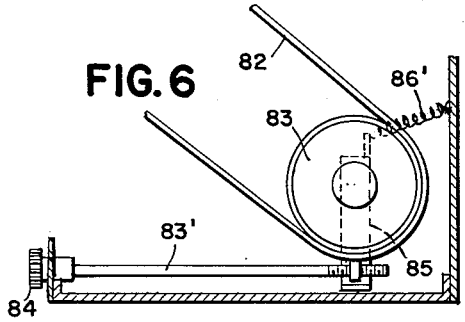
Figure 5:
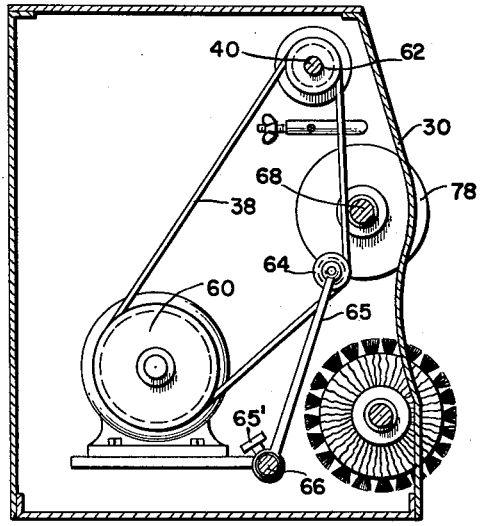
Figure 6B:
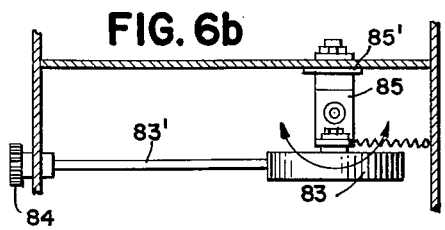

Other objects and the nature and advantages of the instant inventon will be apparent from the following description taken in conjunction with the accompanying drawings, wherein:

FIG. 1 is a front perspective view of the machine;
FIG. 2 is a front elevational view partly in section showing the machine with the front cover removed;
FIG. 3 is an elevational view of an attachment for the machine;
FIG. 4 is a cross sectional view taken along the line 4—4 of FIG. 2;
FIG. 5 is a cross sectional view taken along the line 5—5 of FIG. 2;
FIGS. 6, 6a and 6b are fragmentary views of a regulation device on the machine;
FIG. 7 is a fragmentary view of a sharpening guide on the machine; and
FIG. 8 is a cross-sectional view taken along the line 8—8 of FIG. 2.

The shoe repair machine illustrated in the drawings is a combined machine provided with a permanently attached heel trimmer, a sole trimming attachment, scouring equipment to sand surfaces to shape, consisting of an endless scouring band with a centralization system to keep the belt in place, a scouring wheel, and a breaster attachment. The equipment also has two edge setting irons for providing a hard smooth finish to toplift and sole edges, and burnishing equipment consisting of two leather burnishing wheels and two brushes for waxing and polishing heels and soles. Finally, the machine includes a vacuum system for collecting the dust.

The machine consists of an outer upper case 10 which fits onto a base 12. The upper case 10 may however be adapted to be installed onto existing counters or fixtures as desired. As illustrated, the base 12 is provided with doors 14 to permit access to the interior thereof. The upper case 10 is attached to a lower plate 16 which rests on the base 12. The plate 16 has a motor 18 attached to the lower side thereof which operates a blower 20 extending through an opening 22 in the plate 16. A dust collecting bag, not shown, is located in the base 14 and acts to collect the leather dust blown into the bag by the blower 20 which creates a vacuum in the upper case 10 and removes the dust as it forms at the working tools.

The upper case 10 is completely enclosed except for openings therein and comprises a top, back wall, a left side wall 26, a right side wall 28 and a removable front wall 30. The front wall 30 is in two portions, the upper portion 30¹ having a handle 32 to assist in its removal when access is required to the inside of the case.

The upper case 10 includes approximately one-half the width of the base. The remaining portion of the base is enclosed at the back, sides and top but is open at the front to form a working space 34. Inclined plates 36 are located at the lower end of space 34 and act to cover the openings 24 formed in the left side of the plate 16. These openings 24 are adapted to receive containers for dye, glue, etc.

As best shown in FIG. 2, the machine is provided with three shafts adapted to actuate sets of working tools at their optimum speeds. The shafts are driven by a double shafted motor 37, V-belts 38 and 39 pulleys 69, 70 and 76 mounted on the shafts and pulleys 60 and 37' mounted on the motor output shaft. The sizes of the pulleys 37', 60, 69, 70 and 76 regulate the speed of rotation of the three shafts and the tools mounted thereon. The upper shaft 40 is provided at its left end with a permanently attached heel trimming device 41 extending into the space 34. A sole trimming attachment 42, shown in FIG. 3, can be fitted into a conical tapered and threaded hole at the left end of the shaft 40 without in any way disturbing the heel trimming device 41. The heel trimming device 41 includes a milling cutter 43 on the left end for trimming excess material from the heel lift. To the right is a metal step cone having three sections. The left section 44 is coated with a brown wax. The right section is coated with a black wax and the extreme right section 48 is coated with a brown wax. After the top piece has been trimmed to size on the milling cutter 43, the top piece is then held against the band section 46 if it is black. If it is brown, the top piece is applied to the band section 44 and the inside of the top piece is coated by use of the angled section 48. A smooth polished colored finish is thus applied to the top piece whether it be black or brown. The metal step cone is adjustable along said shaft with respect to the milling cutter 43 to act as a guide to control the width of the cutter face exposed. This is accomplished by having the inner diameter of the left section 44 somewhat greater than the outer diameter of the milling cutter 43 so that it can slide thereover.

Thus, it is seen that the edge setter 44, 46 is attached to the same shaft and immediately next to the milling cutter 43. This results in a definite saving of motion and time since in every case, the next operation immediately following the operation of the miller cutter is to use the edge setter to apply a finish to the top lift. The special shape of inclined step 48 makes it possible to also set the inside surface of the top lift.

The sole trimming attachment 42 may be readily attached to the same shaft 40 as the heel trimming device. This is useful, since when a shoe is to be resoled and reheeled, the trimming of the heel and sole are usually done successively, and here the two operations can be done at the same work station. The sole trimming attachment is provided with a shaft 49 at its right end that is tapered at 50 and threaded at 52 for use in attachment to the shaft 40 of the machine. The conical portion of the shaft 50 gives additional support so that the attachment 42 rotates concentrically with the shaft 40. The left end of the attachment 42 has the cutter 54 which is used for trimming the soles of the shoes being resoled.

Attached to the right end of the shaft 40 within the casing 10 is a sharpening stone 56. The parts 57, 58 and 59, shown best in FIG. 7, are used as a guide for sharpening the milling cutter. In use the milling cutter is slid over the shaft 59 and in doing so the teeth of the milling cutter pass under the stone 56. This attachment is not a part of the present invention.

The shaft 40 is rotated by the motor 37 through pulley 60, belt 38 and pulley 62. The belt 38 is maintained stretched by means of an idler pulley 64 at the end of belt tightener 65 which is pivotally attached at its other end to a shaft 66 by means of a bushing. The bushing and tightener 65 can be locked into the desired position by tightening a bolt 65' thereby controlling the tension of the belt 38.

A second actuating shaft 68 and a lower shaft 90 are connected to the output shaft of motor 37 by pulley 69 on shaft 90, belt 39 and pulley 70 on shaft 68 whereby rotation of the output shaft of motor 37 rotates the shafts 68 and 90 simultaneously as shown in FIG. 8. On the left end of shaft 68 outside of the casing 10 and in the space 34 is a breaster tool 72. An opening 74 in the wall 26 permits the vacuum system to draw any particles from the breaster 72 through the opening 74 and thence down into the dust collection system. Scouring wheels 76 and 78 are mounted on the shaft 68 and their working faces extend through openings 79 and 80 respectively in the front wall 30. The scouring wheel 76 holds a sanding belt 82 which passes around pulley 83. As shown in FIGURES 6, 6a and 6b, a knob 84 regulates the part 85 to swing the pulley 83 from side to side as shown by the arrow in FIG. 6b. An angle iron 85' is bolted to the frame of the machine and supports part 85 which is attached so that it can pivot thereon. Rod 83' is threadedly engaged with the fitting 84' so that as knob 84 is rotated the part 85 pivots thereby turning pulley 83 allowing the belt 82 to center itself. Spring 86' allows for the correct tension of the belt 82. Scouring wheel 78 is covered by an abrasive sanding surface.

A sole edge setter 86 is adapted to be attached to the right end of shaft 68. The breaster 72 and the edge setter 86 are easily removable from the ends of the shaft for replacement with other tools.

The lower shaft 90 which is also rotated by the motor 37 through pulley 69 and belt 39 as shown in FIG. 8 has two sets of polishing tools 91, 92 and 91¹, 92¹ mounted thereon for rotation therewith. The tools 91, 91¹ are leather buffers and the tools 92, 92¹ are brushes.

Bracket 94 is a part of the left side wall 26 of the casing and serves to support the ball bearing boxes for the two upper shafts as well as to add rigidity to the machine.

It should be particularly noted that the shafts 68 and 90 are equipped with tools in such a way that two full work stations are created. The grinding tool 76 is above one set of polishing tools 91, 92 while the grinding tool 78 is above a set of polishing tools 91¹, 92¹. These are not exactly above each other to prevent abrasive grit from being thrown from the grinding tools onto the polishing tools and to prevent the shoe from coming into contact with the grinding tool when it is being polished.

Thus the machine forms a double stand machine on which two workers can work with complete tools at the same time. Each worker may stay at the same spot to do the grinding and polishing work completely.

A special feature of this machine is that the dust is collected by a vacuum system which includes the case itself, the high speed blower or fan and a dust collecting bag. The case can serve as a vacuum system for spray dying of shoes merely by raising the upper front cover 30¹ and providing a fixture to hold the shoe during the spray dying.

The conical shaft and thread cutter attachment of FIG. 3, is unique as it provides a true running tool for working soles on the same shaft used for heels without disturbing the setting of the heel trimmer.

By mounting the scouring tools on a different shaft from the polishing tools, they can operate at different speeds. This is desirable since the optimum speed of abrasive scouring tools is higher than the optimum speed for polishing tools.

It will be obvious to those skilled in the art that various changes may be made without departing from the spirit of the invention and therefore the invention is not limited to what is shown in the drawings and described in the specification, but only as indicated in the appended claims.

What is claimed is:

1. In a shoe repair machine, a heel trimming and setting device comprising a rotatable shaft, means for rotating said shaft, a cutter tool mounted on said shaft, and a two section setting device mounted on said shaft in a position immediately adjacent to the cutter, one section of said setting device being coated with wax of one color and the other section being coated with wax of another color whereby the heel may be trimmed and set at a single work station.

2. In a shoe repair machine in accordance with claim 1 wherein an inclined step is mounted on said shaft located adjacent the section of the setting device farthest from the cutter, said inclined step being coated with wax whereby the inside surface of a heel can be set by contact therewith.

3. In a shoe repair machine, a heel trimming and setting device comprising a rotatable shaft, means for rotating said shaft, a cutter tool mounted on said shaft, and a setting device mounted on said shaft in a position immediately adjacent to the cutter and having an inner diameter somewhat greater than the outer diameter of said cutter, said setting device being adjustable along said shaft to cover a portion of the width of said cutter and thereby acts as a guide to control the width of the cutter face exposed.

4. In a shoe repair machine in accordance with claim 1, wherein the section of the setting device nearest to the cutter has an inner diameter somewhat greater than the outer diameter of said cutter, said cutting device being adjustable along said shaft to cover a portion of the width of said cutter and thereby act as a guide to control the width of the cutter face exposed.

5. In a shoe repair machine in accordance with claim 1 wherein a sole trimming tool is attached to the end of said shaft adjacent to the heel trimming device.

6. In a shoe repair machine in accordance with claim 5, wherein the sole trimming tool is attached to said shaft by means of a conical shaft having a threaded outer end.

7. In a shoe repair machine, a first rotatable shaft, heel trimming and setting tools mounted on said shaft, a second rotatable shaft, scouring tools mounted on said shaft, a third rotatable shaft, polishing tools mounted on said shaft, and means for rotating each said shaft at a speed optimum to the tools mounted thereon.

8. In a shoe repair machine in accordance with claim 7, wherein two of said scouring tools are mounted on said second shaft in spaced relationship thereon and two of said polishing tools are mounted on said third shaft, one scouring tool on said second shaft and one polishing tool on said third shaft being arranged in proximity to one another to form a separate work station from the second of said tools mounted on said second and third shafts which form a second work station.

References Cited in the file of this patent

UNITED STATES PATENTS

| | | |
|---|---|---|
| 1,842,551 | Klos | Jan. 26, 1932 |
| 1,964,472 | Krag | June 26, 1934 |
| 2,231,134 | Marchetta | Feb. 11, 1941 |
| 2,263,682 | Minett | Nov. 25, 1941 |
| 2,556,397 | Prodromos | June 12, 1951 |

FOREIGN PATENTS

| | | |
|---|---|---|
| 623,158 | Germany | May 20, 1934 |